United States Patent [19]
Benfer, Jr. et al.

[11] Patent Number: 5,059,584
[45] Date of Patent: Oct. 22, 1991

[54] METHOD FOR HOT ISOSTATIC PRESSING A CERAMIC ARTICLE

[75] Inventors: Richard H. Benfer, Jr., Arlington; Kerry T. Richards, Medfield, both of Mass.

[73] Assignee: United States of America as represented by the Secretary of the Army, Washington, D.C.

[21] Appl. No.: 519,043

[22] Filed: May 4, 1990

[51] Int. Cl.$^5$ .................. H01L 39/12; B29C 43/10
[52] U.S. Cl. .......................... 505/1; 264/56; 264/65; 505/739
[58] Field of Search .............. 264/65, 570; 505/1, 505/725, 739; 419/49, 48, 66, 68

[56] References Cited

U.S. PATENT DOCUMENTS 4,929,596  5/1990  Meyer et al. .................. 505/740

OTHER PUBLICATIONS

Tien et al., ". . . (Hip) for the Densification of Oxide Superconductors", *Matls. Res. Soc. Extended Abstracts*, Apr. 5–9, 1988.

*Primary Examiner*—Jan H. Silbaugh
*Assistant Examiner*—Christopher A. Fiorilla
*Attorney, Agent, or Firm*—Saul Elbuam; Guy M. Miller

[57] ABSTRACT

A method for treating a ceramic article by hot isostatic pressing provides for the placement of the ceramic article in a capsule with an oxygen donor which is separated from the ceramic article by an oxygen permeable barrier such as silica cloth. The silica cloth barrier allows oxygen to flow from the donor through the barrier and surround the ceramic article. The capsule containing the ceramic article and oxygen donor are then subjected to a high temperature gas at high pressure in order to collapse the capsule around the ceramic article to compact it without substantially reducing its oxygen content.

3 Claims, 1 Drawing Sheet

METHOD FOR HOT ISOSTATIC PRESSING A CERAMIC ARTICLE

BACKGROUND OF THE INVENTION

The invention described herein may be manufactured, used and licensed by or for the Government for Governmental purposes without the payment to us of any royalty thereon.

Hot isostatic pressing (HIP) is a method of consolidating loose powders or relatively porous bulk materials by the simultaneous application of heat and pressure. The pressure is applied through the use of high pressure gas, usually argon or nitrogen. Using gas to apply the pressure allows for uniform pressure across the entire surface of the material. This makes the HIP process ideal for difficult-to-form materials or complex shapes.

One problem encountered with HIPing is the change in stoichiometry of some materials during processing, which change is normally detrimental to the desired material properties. In particular, this is the problem with the HIPing of superconducting ceramics of the $RBa_2Cu_3O_{7-X}$ class (where R is a rare earth element). Although this material can be HIPed to near theoretical density, oxygen in the material is lost during processing, degrading the material's superconducting properties.

It is, therefore, an outstanding object of the invention to provide a ceramic article and a method for forming it, so that the oxygen content is not substantially reduced.

Another object of this invention is the provision of a method for hot isostatic pressing of a ceramic article without reduction of oxygen.

A further object of the present invention is the provision of a method for forming an article from a superconducting powder, and consolidating the powder without affecting its superconducting properties.

It is another object of the instant invention to provide a superconducting ceramic article formed by hot isostatic pressing in which oxygen loss is controlled.

With these and other objects in view, as will be apparent to those skilled in the art, the invention resides in the combination of elements set forth in the specification and covered by the claims appended hereto.

SUMMARY OF THE INVENTION

In general, the invention has to do with a ceramic article and a method for treating it by hot isostatic pressing, which consists of the steps of placing the article in a capsule, placing an oxygen donor in the same capsule, separating the article from the donor by a barrier which is oxygen permeable, and subjecting the capsule and contents to a high temperature gas at high pressure to collapse the capsule around the article to compact it without substantially reducing its oxygen.

More specifically, the article is formed of a superconducting ceramic powder, and the oxygen donor is $BaO_2$. The barrier is formed of a high purity silica cloth, and the capsule is formed of borosilicate glass.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
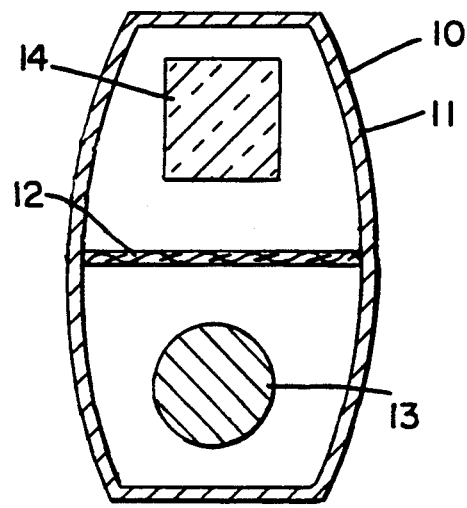
FIG. 1 is a vertical sectional view of an article being made in accordance with the principles of the present invention.

FIG. 1 gives the schematic representation of the invention, indicated generally by the reference numeral 10. The invention consists of three parts: a capsule 11, a barrier 12, and an oxygen donor 13. The sample 14 to be HIPed is sealed under vacuum in the capsule with the barrier material and oxygen donor. The sealed capsule is then placed in a hot isostatic press and processed in a prescribed manner.

As a capsule is heated, the donor 13 evolves oxygen, which creates a higher oxygen pressure and inhibits the loss of oxygen from the material to be processed. The barrier 12 separates the sample 14 from the donor while allowing oxygen to pass through it. As a HIP is pressurized, the capsule collapes and conforms to the shape of the sample and transmits the applied pressure.

Several material concerns have been identified:

Compatibility between the sample, capsule, donor and barrier materials must be assured. Unwanted reactions between these materials must be avoided if the desired properties are to be achieved.

The donor material must evolve oxygen at the proper temperature and the proper amount of donor material must be detailed. This is to insure that the proper amount of oxygen is evolved under the prescribed HIPing conditions.

The capsule material must withstand the high temperatures while being flexible enough to conform to the sample and transmit the HIP pressure.

The HIPing parameters must also be carefully controlled. Both the temperature and pressure schedules must be carefully chosen and closely adhered to during processing.

EXAMPLE 1

The example deals with the fabrication of a ceramic superconductor bulk shape for use in electronic shielding, motor assemblies, etc. HIPing these materials allows for densification at lower temperatures.

Superconducting ceramic powders of the composition $YBa_2Cu_3O_{7-x}$ were consolidated into 4 gram cylinders for use as sample material. Prior to HIPing, this material was heated and then cooled in air between 500° to 200° C. in order to fully incorporate oxygen into its structure.

Figure 2:
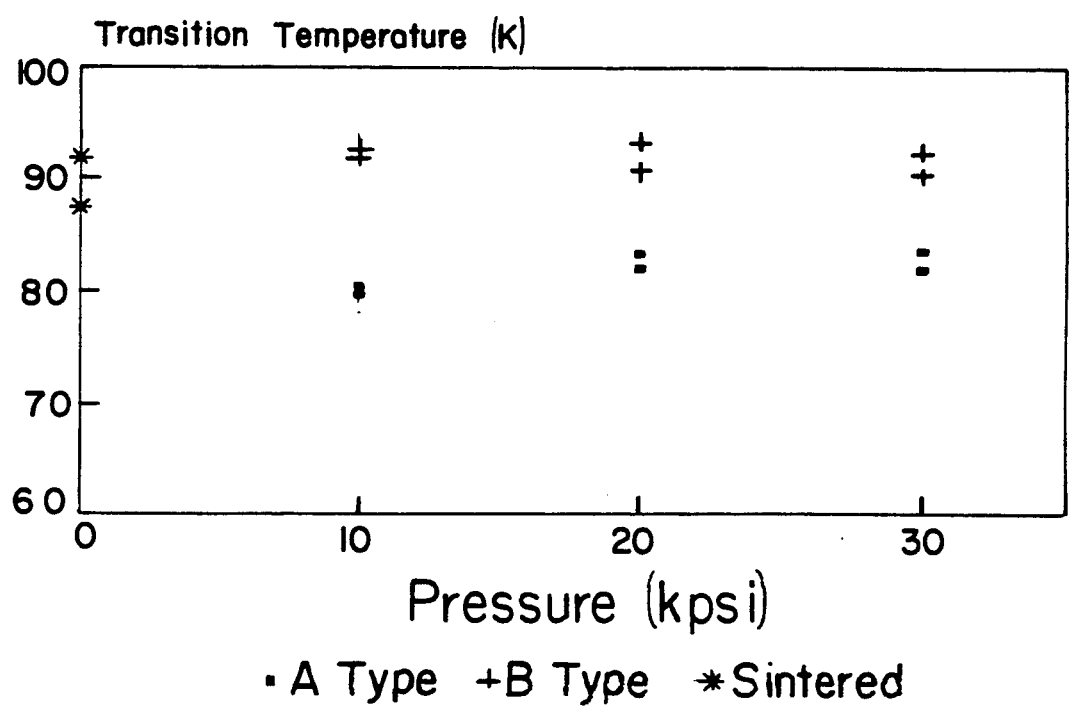
FIG. 2 is a graphical representation comparing the characteristics of the article of the invention with the characteristics of articles made in accordance with the prior art.

Samples were HIPed using the following materials and schedule:

Oxygen donor: $BaO_2$
Barrier material: High purity silica ($SiO_2$) cloth
Capsule material: Borosilicate glass
HIP temperature: 820° C.
HIP pressure: 10,20 and 30 k.p.s.i.
Hold time: 1 hour
Cool down time: 30 minutes Each run was made with two sample configurations:
Sample A: without $BaO_2$
Sample B: with $BaO_2$ FIG. 2 plots the superconduting transition temperatures of the HIPed samples as determined by a.c. magnetic susceptibility testing. (Conventionally sintered samples of $YBa_2Cu_3O_{7-x}$ prepared from the starting superconducting powder are plotted for comparison purposes.) The transition temperature is a useful figure of merit for superconductors. In all cases, the transition temperatures of B samples exceed those of A samples.

EXAMPLE 2

This example deals with the fabrication of a electrooptic ceramic component for use in an electronic phase shifter. For optimum performance, these ceramics should be fully dense and have a full oxygen content.

The ceramic powders of composition $Ba_{1-x}Sr_xTiO_3$ ($x=0.1$ to $x=0.9$) may be consolidated into appropriate shapes. They would then be HIPed using the following materials and schedule:

Oxygen donor: $BaO_2$
Barrier material: High purity silica ($SiO_2$) cloth
Capsule material: Borosilicate glass
HIP Temperature: 1100°–1400° C.
HIP Pressure: 10–30 k.s.i.
Hold time: 30 minutes
Cool down time: 45 minutes

EXAMPLE 3

The following illustrates the application of this invention to the processing of a structural ceramic. HIPing zirconia ($ZrO_2$) has been shown to cause oxygen nonstoichiometry, resulting in degraded high temperature strength.

Zirconia compositions would be consolidated into appropriate shapes and HIPed using the following materials and schedule:

Oxygen donor: $Zr(ClO_4)_2$, $Mg(ClO_4)_2$ or $BaO_2$
Barrier material: High purity silica ($SiO_2$) cloth
Capsule material: Borosilicate glass
HIP Temperature: 1300°–1400° C.
HIP Pressure: 10–30 k.p.s.i.
Hold time: 60 minutes
Cool down time: 30–45 minutes An alternate solution to the problem of oxygen loss is through the use of newly-developed oxygen HIP, where the pressurized gas is a mixture of oxygen and an inert gas. However, due to the difficulties of working with oxygen at high temperatures and pressures, these machines are complex and expensive. For example, modifying the HIP at the US Army Materials Technology Laboratory for use up to 15% oxygen would cost approximately $90,000. The invention described above solves the problem at a cost of a few cents per sample.

The basic idea of HIPing superconductors with an oxygen donor encapsulation system came up in informal conversations between the two inventors. Since then, they had been HIPing superconducting powders ($YBa_2Cu_3O_{7-x}$) that were consolidated into cylinders, wrapped in fiberglass cloth and vacuum sealed in Pyrex tubing. Powders processed this way and HIPed at 820° C. proved to be nonsuperconducting. A change in the method of sealing the tube (propane torch in lieu of 1000° C. furnace) was tried. They found that the furnace method of encapsulation reduced the powder while the torch method did not. However, upon HIPing at 820°C., powders sealed by both methods did not superconduct.

It was, therefore, determined that the powders were being reduced by the HIPing process. This was later confirmed when post-HIP powders were reannealed in air and regained superconductivity. They then decided to investigate the use of a compound which would evolve oxygen during the HIPing (acting essentially as an oxidant) in the hopes of reducing the oxygen loss in the superconducting powder. A review of inorganic chemistry texts yielded $BaO_2$ and $KClO_4$ as candidate materials. $BaO_2$ was chosen, since it was compatible with the superconducting system being studied.

The placement of the oxygen donor and the superconducting powder was then investigated. Two configurations were considered: (A) with the oxygen donor surrounding the powder and (B) with the oxygen donor mixed directly with the powder (resulting in a Ba excess).

Initial HIPing of configuration (B), with a 4:1 weight ratio of superconducting powder to $BaO_2$, yielded overpressures from evolved oxygen, which caused the capsule to rupture. A reduction in the amount of $BaO_2$ and a better pressure/temperature schedule was thought to be the solution.

An 8:1 sample of $YBa_2Cu_3O_{7-x}$ was cold pressed at 22,500 p.s.i. and encapsulated in two Pyrex tubes. This was then HIPed at 820° C. Superconductivity was noted on samples produced in this manner using a.c. magnetic susceptibility measurements.

In order to keep the superconducting powders uncontaminated and stoichiometric with respect to Ba, the inventors decided to use configuration (A), where the oxygen donor and the sample are kept separate. The fiberglass cloth barrier material (initially used to isolate the sample from the capsule) was now used to separate the sample from the oxygen donor. This is the arrangement shown in FIG. 1.

Further HIPing experiments were performed to optimize the processing conditions (temperatures, pressures, hold time, etc.) materials and encapsulation configuration. Materials from these experiments were then tested for superconductivity as noted above.

Based upon the success that was experienced with superconducting materials, the inventors have proposed two additional systems that may benefit from this particular processing method. These are the electrooptic ceramic $Ba_{1-x}Sr_xTiO_3$ and the structural ceramic $ZrO_2$.

The first material is of interest for use in electronic phase shifters. This use requires a well densified material with stoichiometric oxygen content. HIPing would result in dense materials at considerably lower temperatures, enabling possible cofiring with electrode materials. However, the oxygen content would have to be maintained; otherwise, the dielectric properties would be harmed. The method detailed above would address that concern.

Zirconia is of interest as a structural material. It has been noted that oxygen loss in zirconia results in impaired performance. HIPing in the manner detailed above could result in a dense shape at lower processing temperatures without oxygen loss.

The operation and advantages of the present invention will now be readily understood in view of the above description.

The purpose of this invention is to enable the fabrication of superconductive, electronic, and structural ceramics by hot isostatic pressing without incurring oxygen loss and without the resulting nonstoichiometry normally associated with that process. The higher oxygen content results in improved properties for many ceramic materials, including the new class of high temperature superconductors.

Hot isostatic pressing (HIP) is normally performed in nitrogen or argon atmospheres at high pressures and high temperatures. These conditions can cause reduced oxygen content in the fabricated materials, which results in poorer performance. This invention is a readily implemented method for controlling the oxygen losses in materials during HIPing.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Method for forming an oxide ceramic article by hot isostatic pressing, comprising the steps of:

(a) placing an oxide ceramic material in a capsule,
    (b) placing an oxygen donor in the capsule,
    (c) separating the ceramic material from the donor by a barrier which is oxygen permeable, and
    (d) subjecting the capsule and contents of a high temperature gas at high pressure to collapse the capsule around the ceramic material and to cause the oxygen donor to release oxygen which permeates the barrier, whereby the ceramics material will be compacted without substantially reducing the oxygen content of the ceramic material.

2. Method as recited in claim 1, wherein the ceramic material is a superconducting ceramic powder, and wherein the oxygen donor is $BaO_2$.

3. Method as recited in claim 1, wherein the barrier is formed of a high purity silica cloth, and wherein the capsule is formed of borosilicate glass.

* * * * *